United States Patent
Czeck et al.

(10) Patent No.: US 8,572,534 B2
(45) Date of Patent: Oct. 29, 2013

(54) SYSTEM AND METHOD FOR DESIGNING MULTIPLE CLOCK DOMAIN CIRCUITS

(75) Inventors: Edward W. Czeck, Winchester, MA (US); Ravi A. Nanavati, Brighton, MA (US); Rishiyur S. Nikhil, Arlington, MA (US); Joseph E. Stoy, Boston, MA (US)

(73) Assignee: Bluespec, Inc., Framingham, MA (US)

( * ) Notice: Subject to any disclaimer, the term of this patent is extended or adjusted under 35 U.S.C. 154(b) by 580 days.

(21) Appl. No.: 12/706,470

(22) Filed: Feb. 16, 2010

(65) Prior Publication Data

US 2010/0146468 A1 Jun. 10, 2010

Related U.S. Application Data

(62) Division of application No. 11/448,582, filed on Jun. 7, 2006, now Pat. No. 7,665,059.

(51) Int. Cl.
*G06F 9/455* (2006.01)
*G06F 17/50* (2006.01)

(52) U.S. Cl.
USPC ........... 716/113; 716/106; 716/108; 716/110; 716/112

(58) Field of Classification Search
USPC ................................ 716/106–115
See application file for complete search history.

(56) References Cited

U.S. PATENT DOCUMENTS

| | | | |
|---|---|---|---|
| 5,530,863 A | 6/1996 | Hino | |
| 5,696,942 A | 12/1997 | Palnitkar et al. | |
| 6,263,303 B1 | 7/2001 | Yu et al. | |
| 6,584,597 B1 | 6/2003 | Kishinevsky et al. | |
| 6,597,664 B1 | 7/2003 | Mithal et al. | |
| 6,977,907 B2 | 12/2005 | Mithal et al. | |
| 7,073,146 B2 * | 7/2006 | Sarwary et al. | 716/108 |
| 7,203,912 B2 | 4/2007 | Moona et al. | |

(Continued)

FOREIGN PATENT DOCUMENTS

| | | |
|---|---|---|
| EP | 0329233 A2 | 8/1989 |
| EP | 0829812 A2 | 3/1998 |
| WO | 0113285 A2 | 2/2001 |

OTHER PUBLICATIONS

"Pragmatic Simulation-Based Verification of Clock Domain Crossing Singals and Jitter using System Verilog Assertions", by Mark Litterick, Verilab, Munich, Germany @ Feb. 1, 2006.*

(Continued)

*Primary Examiner* — Nha Nguyen
(74) *Attorney, Agent, or Firm* — Loginov & Associates, PLLC; William A. Loginov; Keri E. Sicard

(57) ABSTRACT

A Hardware Description Language (HDL) utilizing a Term Rewriting System (TRS) is provided that simplifies handling of clocks, and signaling between various clock domains of a multi-clock domain circuit specification. A specific clock data type is supplied for use with clock signals. Using the clock data type, and other requirements of a circuit specification, clock domain crossing between domains of clocks of the same clock family is handled implicitly. For clock domain crossing between clock domains driven by clocks of different clock families, a "hardware approach" and a "linguistic approach" are provided. A "hardware approach" provides facilities to explicitly specify a synchronizer, using, in part, TRS rules. A "linguistic approach" allows a designer to abstracts the instantiation of synchronizers and instead specify a circuit specification in terms of differently clocked interfaces.

6 Claims, 8 Drawing Sheets

(56) References Cited

U.S. PATENT DOCUMENTS

| | | | |
|---|---|---|---|
| 7,263,675 B2* | 8/2007 | Dargelas | 716/136 |
| 7,350,180 B1 | 3/2008 | Slavin | |
| 8,224,636 B2* | 7/2012 | Kundert | 703/14 |
| 2002/0199173 A1 | 12/2002 | Bowen | |
| 2003/0005393 A1 | 1/2003 | Kawamoto | |
| 2003/0135834 A1* | 7/2003 | Tojima et al. | 716/10 |
| 2003/0188272 A1 | 10/2003 | Korger et al. | |
| 2004/0052215 A1* | 3/2004 | Mithal et al. | 370/252 |
| 2005/0097484 A1* | 5/2005 | Sarwary et al. | 716/6 |
| 2005/0273735 A1* | 12/2005 | Dargelas | 716/4 |
| 2005/0273741 A1* | 12/2005 | Lahner et al. | 716/6 |

OTHER PUBLICATIONS

Steckel, "U.S. Appl. No. 11/047,281, System and Method for Designing Multiple Clock Doman Circuits", Jan. 31, 2005.
Esposito, et al., "U.S. Appl. No. 11/047,329 Entitled System and Method for Scheduling TRS Rules", Jan. 31, 2005.
Ayala-Rincon, et al., "Architectual Specification, Exploration and Simulation Through Rewriting-Logic", 2002.
Bluespec, Inc., "Are You Building Your ESL Foundation on Sand?", Feb. 1, 2005, pp. 1-13.
Bluespec, Inc., "Automatic Generation of Control Logic With Bluespec Systemverilog", Feb. 1, 2005.
Bluespec, Inc., "Bluespec Systemverilog, Version 3.8, Reference Guide, Preliminary Draft", Sep. 2, 2004.
Arvind, et al., "Computer Architecture Modeling, Synthesis, and Verification", "Laboratory for Computer Science", Mar. 2003, Publisher: MIT.
Dave, "Designing a Processor in Bluespec", "Department of Electrial Engineering and Computer Science", Jan. 2005, Publisher: MIT.
Dave, "Designing a Reorder Buffer in Bluespec, Computation Structures Group Memo 478", "Proceedings of Formal Methods and Models for Codesign (Memocode '2004)", Jun. 2004, Publisher: MIT Computer Science and Artificial Intelligence Laboratory.
Shen, et al., "Design and Verification of Speculative Processors, Computation Structures Group Memo 400(B)", "Laboratory for Computer Science", Jun. 1998, Publisher: MIT.
Liao, et al., "An Efficient Implementation of Reactivity for Modeling Hardware in the Scenic Design Environment", 1997, Publisher: ACM, Inc.
Rosenband, et al., "The Ephemeral History Register: Flexible Scheduling for Rule-Based Design, Computation Structures Group Memo 479", "Proceedings of Formal Methods and Models for Codesign (Memocode '2004)", Jun. 22, 2004, Publisher: MIT Computer Science and Artificial Intelligence Laboratory.
Esterel Technologies, "The Esterel V7 Reference Manual: Version 7_30—Initial IEEE Standardization Proposal", Nov. 3, 2005.
Rosenband, et al., "Flexible and Scalable Hardware Synthesis From Guarded Atomic Actions", "Computer Science and Artificial Intelligence Laboratory", 2004, Publisher: MIT.
Nikhil, "Future Programming of FPGAS", Feb. 23, 2004, Publisher: Bluespec, Inc.
Esterel Technologies, "Getting Started With Esterel Studio 5.3", 2005.
Hoe, et al., "Hardware Synthesis From Term Rewriting Systems, Computation Structures Group Memo 421A", "Laboratory for Computer Science", Aug. 20, 1999, Publisher: MIT.
Hoe, et al., "Hardware Synthesis From Term Rewriting Systems, Computation Structures Group Memo 421A", "Proceedings of X IFIP International Conference on VLSI", Aug. 20, 1999, Publisher: MIT Computer Science and Artificial Intelligence Laboratory.
Arvind, et al., "High-Level Synthesis: An Essential Ingredient for Designing Complex ASICS", Nov. 6, 2004.
Arvind, et al., "High-Level Synthesis: An Essential Ingredient for Designing Complex ASICS, Computation Structures Group Memo 473", "Proceedings of the International Conference on Computer Aided Design", Nov. 6, 2004, Publisher: MIT Computer Science and Artificial Intelligence Laboratory.
Wunderlich, et al., "In-System FPGA Prototyping of an Itanium Microarchitecture", "Proceedings of the 22nd International Conference on Computer Design", Oct. 2004, Publisher: ICCD.
Shen, et al., "Modeling and Verification of ISA Implementations, Computation Structures Group Memo 400(a)", "Laboratory for Computer Science", Jun. 20, 1997, Publisher: MIT.
Rosenband, et al., "Modular Scheduling of Atomic Actions, Computation Structures Group Memo 463", "Computer Science and Artificial Intelligence Laboratory", Jun. 4, 2004, Publisher: MIT.
Rosenband, et al., "Modular Scheduling of Guarded Atomic Actions", "Proceedings of the 41st Design Automation Conference", Jun. 2004, Publisher: MIT, Computer Science and Artificial Intelligence Laboratory.
Hoe, "Operation-Centric Hardware Description and Synthesis", "Transactions on Computer-Aided Design of Integrated Circuits and Systems", Sep. 2004, pp. 1277-1288, vol. 23, No. 9, Publisher: IEEE.
Hoe, "Operation-Centric Hardware Discription and Synthesis", Apr. 28, 2000, Publisher: MIT.
Nordin, et al., "Synchronous Extensions to Operation-Centric Hardware Description Languages", 2004, Publisher: IEEE.
Hoe, et al., "Synthesis of Operation-Centric Hardware Descriptions, Computation Structures Group Memo 426A", "Laboratory for Computer Science", Jul. 29, 2000, Publisher: MIT.
Poyneer, et al., "A TRS Model for a Modern Microprocessor: Computation Structures Group Memo 408", "Laboratory for Computer Science", Jun. 25, 1998, Publisher: MIT.
Arvind, et al., "Using Term Rewriting Systems to Design and Verify Processors, Computation Structures Group Memo 419", MIT, Computer Science and Artificial Intelligence Laboratory, May 1999, Publisher: IEEE Micro Special Issue on Modeling and Validation of Microprocessors.
Arvind, et al., "Bluespec: Why Chip Design Can't Be Left EE'S", Mar. 22, 2004, Publisher: University of California, Irvine.
Arvind, et al., "Using Term Rewriting Systems to Design and Verify Processors", "MIT LCS Memo CSG-419", May 1999, Publisher: IEEE Micro, Published in: US.

* cited by examiner

```
/*================================================================================
================================================
    263  PASSING OF COMPLETIONS BETWEEN CLOCK DOMAINS :;
    264  COMPLETION ORIGINATES ON COMPLETING SIDE. IT'S THEN SYNCHRONIZED WITH TWO
FLIP-FLOPS TO CROSS TO REQUESTING CLOCK DOMAIN
    265
================================================================================
============================================*/
    266  // MAIN COMPLETION FLIP – FLOP – TRIGGERED BY COMPLETING SIDE'S CLOCK
    267  // COMPLETION SIDE COMPLETION PENDING FLAG IS CLEARED WHEN DONE FLAG
PROPAGATES THROUGH CLOCK DOMAINS
    268  WIRE COMP_COMP_CLEAR = COMP_DONE_REG_MAIN && ~COMP_DONE_REG_CLR ;
    269  ALWAYS@(POSEDGE COMP_CLK_IN OR POSEDGE RESET_IN)
    270  BEGIN
    271      IF ( RESET_IN )
    272          COMP_COMP_PENDING <= #` FF_DELAY 1'b0 ;
    273      ELSE
    274      IF ( COMP_COMP_CLEAR )
    275          COMP_COMP_PENDING <= #` FF_DELAY 1'b0 ;
    276      ELSE
    277      IF ( COMP_IN && COMP_REQ_PENDING )
    278          COMP_COMP_PENDING <= #` FF_DELAY 1'b1 ;
    279  END
    280
    281  ASSIGN COMP_COMP_PENDING_OUT = COMP_COMP_PENDING ;
    282
    283  // INTERMEDIATE STAGE COMPLETIONSYNCHRONIZATION FLIP – FLOP – THIS ONE IS
PRONE TO METASTABILITY
    284  PCI_SYNCHRONIZER_FLOP # (1, 0)  COMP_SYNC
    285  (
    286      .DATA_IN          (COMP_COMP_PENDING) ,
    287      .CLK_OUT          (REQ_CLK_IN) ,
    288      .SYNC_DATA_OUT    (SYNC_REQ_COMP_PENDING) ,
    289      .ASYNC_RESET      (RESET_IN)
    290  ) ;
    291
    292  // REQUEST SIDE COMPLETION PENDING FLIP FLOP IS CLEARED WHENEVER DONE IS
SIGNALLED OR COMPLETION COUNTER EXPIRES – 2^^16 CLOCK CYCLES
    293  WIRE REQ_COMP_PENDING_CLEAR = DONE_IN|| COMP_CYCLE_COUNT[16] ;
    294
    295  // REQUEST SIDE COMPLETION PENDING FLIP FLOP IS DISABLED WHILE DONE FLAG IS
SET
    296  WIRE REQ_COMP_PENDING_ENA  = ~REQ_DONE_REQ ;
    297
    298  // REQUEST SIDE COMPLETION FLIP FLOP -  GETS A VALUE FROM INTERMEDIATE STAGE
SYNC FLIP FLOP
    299  ALWAYS@(POSEDGE  REQ_CLK_IN OR POSEDGE RESET_IN)
    300  BEGIN
    301      IF ( RESET_IN )
    302          REQ_COMP_PENDING <= #` FF_DELAY 1'b0 ;
    303      ELSE
    304      IF ( REQ_COMP_PENDING_CLEAR )
    305          REQ_COMP_PENDING <= #` FF_DELAY 1'b0 ;
    306      ELSE
    307      IF ( REQ_COMP_PENDING_ENA )
    308          REQ_COMP_PENDING <= #` FF_DELAY SYNC_REQ_COMP_PENDING ;
    309  END
    310
```

FIG. 3
(PRIOR ART)

```
(* SYNTHESIZE *)                                    600
MODULE MKRANDTOP (UINT# (4) RATIO,
                  BOOL G1, BOOL G2, EXTIFC IFC) ;
    // DECLARE THE GATED CLOCKS AND THEIR
    // ASSOCIATED RESETS:
    // C1 WILL BE A SLOWER CLOCK:
    CLOCK C1 <- MKSLOWCLOCK (RATIO, G1) ;
    RESET R1 <- MKSYNCRESETFROMCC (3, C1) ;
    // C2 IS A GATED VERSION OF CURRENTCLOCK:
    CLOCK C2 <- MKGATEDCLOCK (G2) ;                      610
    RESET R2 <- MKSYNCRESETFROMCC (3, C2) ;
    // C0 IS SIMILAR, ON WHEN EITHER OF THE
    // CONSUMERS IS ON:
    CLOCK C0 <- MKGATEDCLOCK GATE0 (G1|| G2) ;
    RESET R0 <- MKSYNCRESETFROMCC (3, C0) ;

// INSTANTIATE THE SUB-MODULES,
    // APPROPRIATELY CLOCKED :
    GENPAIR GENS <-
        MKGENPAIR (CLOCKED_BY C0, RESET_BY R0) ;
    USERIFC USER1 <-
        MKUSER1 (CLOCKED_BY C1, RESET_BY R1) ;           620
    USERIFC USER2 <-
        MKUSER2 (CLOCKED_BY C2, RESET_BY R2) ;

// SINCE C2 AND C0 ARE IN THE SAME
    // FAMILY, THERE IS NO NEED FOR EXPLICIT              630
    // CONVERSION:
    MKCONNECTION (GENS.FST, USER2.FST) ;

// C1 IS UNRELATED TO C0, HOWEVER, SO
    // EXPLICIT CONVERSION IS NECESSARY.
    // THIS VERSION USES THE "HARDWARE APPROACH"          640

SYNCFIFOIFC# (BIT# (6) ) FF <-
        MKSYNCFIFO (4, C0,R0, C1) ;

// WE PROVIDE TWO RULES TO ENQUEUE VALUES
    // FROM THE GENERATOR ONTO FF, AND TO
    // DEQUEUE THEM TO SEND TO USER1:
    RULE ENQUEUE_FF ;
        LET X <- GENS.SND.GET ;
        FF.ENQ (X) ;                                     650
    ENDRULE
    RULE DEQUEUE_FF ;
        USER1.FST.PUT (FF.FIRST) ;
        FF.DEQ;
    ENDRULE

// THE EXTERNAL INTERFACES:
    INTERFACE IFCA = USER1.SND;
    INTERFACE IFCB = USER2.SND;
    // ALSO EXPORT THE CLOCK FOR IFCA:
    INTERFACE CA = C1;
ENDMODULE
                        FIG. 6
```

// THIS ONE USES THE "LINGUISTIC APPROACH".

// THERE'S NO NEED TO SPECIFY AN EXPLICIT
// CLOCK FOR THE CONVERTER, SINCE THE CURRENT
// CLOCK IS IN THE SAME FAMILY AS C1.
LET USERLIFC <- MKCONVERTER (4, USERL.FST); }— 810

MKCONNECTION (GENS.SND, USERLIFC); }— 820

FIG. 8A

```
MODULE MKCONVERTER# (INTEGER D)
      (PUT# (A) USED_PUT, PUT# (A) PROVIDED_PUT
    PROVISOS (BITS# (A,SA) ) ;

SYNCFIFOIFC# (A) FF <-
        MKSYNCFIFOFROMCC (D, CLOCKOF (USED_PUT) ) ;     }— 860

RULE DEQUEUE;
        USED_PUT.PUT (FF.FIRST) ;
        FF.DEQ;                                          }— 880
    ENDRULE

METHOD ACTION PUT (X) ;   }— 870
        FF.ENQ (X) ;
    ENDMETHOD
ENDMODULE
```

FIG. 8B

SYSTEM AND METHOD FOR DESIGNING MULTIPLE CLOCK DOMAIN CIRCUITS

RELATED APPLICATIONS

This application is a divisional of U.S. patent application Ser. No. 11/448,582, filed Jun. 7, 2006, entitled SYSTEM AND METHOD FOR DESIGNING MULTIPLE CLOCK DOMAIN CIRCUITS, the entire disclosure of which is herein incorporated by reference.

FIELD OF THE INVENTION

This invention relates generally to the design and verification of digital circuits, and more specifically, to the design and verification of multiple clock domain digital circuits using a high-level hardware description language.

BACKGROUND OF THE INVENTION

Hardware Description Languages (HDLs) have been used for many years to design digital circuits. Such languages employ text-based expressions to describe hardware devices, enabling designers to design larger and more complex systems than possible using previously known gate-level design methods. With HDLs, designers are able to use various constructs to fully describe hardware components and the interconnections between hardware components. Two popular Hardware Description Languages are Verilog, first implemented by Phil Moorby of Gateway Design Automation in 1984, and later standardized under IEEE Std. 1364 in 1995, and VHDL (Very High Speed Integrated Circuit (VHSIC) Hardware Design Language), standardized in IEEE Std. 1076. Both of these languages, and other similar languages, have been widely used to design hardware circuits.

At one level of abstraction, Verilog and VHDL may operate as Register-Transfer Level (RTL) Languages in which circuits have, or are abstracted to have, a set of registers. A designer may use an RTL description to specify the values of the registers in each clock cycle in terms of the values of the registers in the proceeding clock cycle. In this way, an RTL model implements a finite state machine (FSM) of the circuit to be specified.

At another level of abstraction, Verilog and VHDL support a behavioral specification approach. In a behavioral specification approach, the focus is on the functions performed by the circuit, rather than on individual register values. One language that is particularly adapted to this type of approach is SystemC, an open-source kernel that extends the C++ language to enable hardware modeling.

Yet as the complexity of digital circuits has increased, both RTL and behavioral circuit specification techniques have shown their limitations. New HDLs utilizing Term Rewriting System (TRS) technology have addressed some of the limitations of the conventional methods. A TRS adapted for hardware design employs a list of "terms" that describe hardware states, and a list of "rules" that describe hardware behavior. A "rule" captures both a state-change (an action) and the conditions under which the action can occur. Further, each rule has atomic semantics—that is, each rule executes fully without interactions with other rules. This implies that rules may be considered in isolation for analysis and debugging purposes.

More formally, a Term Rewriting System has rules that consist of a predicate (a function that is logical true or false) and an action body (a description of a state transition). In an alternate terminology, the predicate may be called the guard of the rule. A rule may be written in the following form:

rule r: when $\pi(s) \Rightarrow s := \delta(s)$ where s is the state of the system, $\pi$ is the predicate, and $\delta$ is a function used to compute the next state of the system. In a strict implementation of a TRS, only one rule may execute on a given state. However, in modern TRSs, a scheduler is typically used to allow concurrent execution of rules if the rules do not conflict. That is, when several rules have predicates that are true, and the rules do not conflict, modern implementations of TRSs take advantage of concurrent execution to generate more efficient hardware. Due to the atomic semantics of the rules, the state resulting from concurrent execution is the same as if the rules had been executed serially. After all applicable non-conflicting rules are executed on a given state of the system, all rules are re-evaluated for applicability on the new state, and the process continues until no further rules are applicable.

As with conventional HDLs, circuit specifications constructed with HDLs that employ TRS rules are generally structured into a plurality of modules, where each module performs a particular sub-set of functions of the overall circuit design. In contrast to conventional HDLs that generally specify the internal behaviors of modules using well-known always blocks, HDLs that employ TRS rules generally use TRS rules to specify the behaviors. Also, as with conventional HDLs, modules specified using TRS rules generally intercommunicate with each other using defined interfaces. Interfaces provide a structured way to pass signals between modules, and enhance the modularity of designs. An interface to another module may be provided to a module as part of the module's environment, may be instantiated within the module, or may be supplied as arguments to the module.

Furthermore, as with conventional HDLs, HDLs that employ TRS rules typically generate hardware that is synchronous. A synchronous system is one where devices outputs change in response to being triggered at particular intervals by clock signals. The use of clocks advantageously synchronizes the system and is valuable in accounting for propagation delays and other parameters of fabricated devices. While TRS rules themselves seldom explicitly reference clock signals, clock signals are an intrinsic part of virtually all TRS based hardware designs.

Intercommunication among modules is relatively straightforward when all the modules are driven by the same clock, i.e. when all modules are within the same clock domain. A clock domain is defined as a portion of a hardware design that is driven by a single clock signal so that devices within the domain operate in a synchronous, i.e. "in phase", manner.

Intercommunication among modules is only slightly more complex when modules are driven by clocks of different clock domains but the clocks of the different clock domains are all of the same family. Clocks of the same family are defined as clocks driven by the same oscillator, but possibly differing in gating, i.e. activation. For example, it may be desirable in a particular design to "deactivate" a clock in a particular portion of a circuit to save power when that portion of the circuit is not in use. Accordingly, a control signal may be provided with the oscillator signal of the clock, and the control signal may "gate off" the clock in that portion of the circuit at certain times. Simultaneously, other portions of the circuit may be driven by clock signals from the same oscillator that are "gated on." While the "gated off" and "gated on" clocks differ in activation, when they are both active they are exactly in phase, and thus considered of the same family.

Intercommunication among modules becomes more complex when the modules are driven by clocks from different clock domains, where the clocks of the clock domains are of different families. Clocks of different families are generally driven by different oscillators and therefore may be considerably out of phase from one another. Due to the lack of a synchronous phase relationship between the clocks, clocks of different families are often referred to as asynchronous clocks. Multiple asynchronous clocks are used in a wide variety of hardware designs. They are particularly common in System-on-a-Chip (SoC) designs that integrate a number of components of a computer or other complex electronic system into a single chip. Asynchronous clocks are used to advantage in SoC designs to support multiple bus systems, for example, they may be used to support the well known Peripheral Component Interconnect (PCI) and Universal Serial Bus (USB) within the same SoC. Furthermore, asynchronous clocks are often used to support the large size of SoCs that may prevent a single "fast" clock from being effectively distributed over the entire design due to transmission delays.

Absent special provisions, when a data or control signal is sent from a module of a first clock domain of a first family to a module of a second clock domain of a second family, the signal will appear as an asynchronous event in the second clock domain. An asynchronous event may cause a flip-flop or other device in the second clock domain to experience metastability, an undesirable unstable state where the device may hold an incorrect value. Metastability may cause the value of a flip-flop to take many times longer than normal to settle into a correct state, or to oscillating several times between states before settling into one state. Furthermore, metastability may propagate from one device to another device causing a chain of devices to all experience metastability.

FIG. 1A is a schematic block diagram of an exemplary hardware design 100 where metastability may occur due to a signal crossing between clock domains of different families. Two clock domains are shown, Clock Domain A 110 which is driven by Clock A, and Clock Domain B 120 which is driven by Clock B, where Clock A and Clock B are driven by different oscillators. Hardware devices in each clock domain are driven by their respective clocks, for example the two flip-flops 130, 140 are driven by Clock A and Clock B respectively. The first flip-flop 130 stores Signal 1 when triggered at the rising edge of Clock A. The output of the first flip-flop 130, labeled Signal 2, is stored in the second flip-flop 140 at the rising edge of Clock B. The second flip-flop 140 in turn produces an output, labeled Signal 3.

FIG. 1B is an exemplary timing diagram that corresponds to the exemplary hardware design shown in FIG. 1A. The timing diagram has been simplified and idealized for purposes of illustration, and thus the signals shown differ somewhat from signals that would occur in an actual fabricated design. Assume that Signal 1 is transitioned from a high state to a low state at a transition region 160. Further, suppose the rising edge of Clock B occurs during the transition region of signal 160. In such a case, the second flip-flop 140 will sample Signal 2 while it is in an intermediate state between the high and low states. By doing so, the setup time (commonly represented $t_{su}$) and the hold time (commonly represented $t_h$) requirements of the second flip-flop 140 may be violated. The violation causes the flip-flop 140 to become metastable, as shown by the metastable region 170 of Signal 3, where the value of Signal 3 is uncertain. As discussed above, this uncertainty is highly undesirable in a hardware design.

To avoid undesirable metastability, while still allowing signals to be passed between different clock domains, hardware designers typically employ synchronizers to connect the clock domains. There are a variety of commonly used synchronizer designs, including multiple-flip-flop-based synchronizers, handshake-based synchronizers, and FIFO-based synchronizers. Of these, the most commonly used synchronizer design is the two-flip-flop synchronizer.

FIG. 2 is a schematic block diagram of a two-flip-flop synchronizer 200 that is well known in the art. As in FIG. 1, a flip-flop 230 (which technically is not considered part of the synchronizer's two flip-flops) is located in a Clock Domain A 210. The two flip-flops 240, 250 of the two-flip-flop synchronizer 200 are located in Clock Domain B 220, which is of a different clock family than Clock Domain A. When a signal is propagated to the first flip-flop 240 in Clock Domain B 220, there is likelihood that the first flip-flop 240 may enter a metastable state. Yet, even if the first flip-flop 240 become metastable, there is a much smaller probability that the second flip-flop 250 will become metastable as well, when driven by the first flip-flop 240. Thus, by allowing only the second flip-flop 250 to interact with the rest of the devices in Clock Domain B 220, the probability that metastability will propagate is reduced to an acceptable level.

FIG. 3 is an exemplary code excerpt that includes an HDL implementation of a two-flip-flop synchronizer. In this particular example, the language employed is Verilog, yet the general concepts employed here are applicable to other conventional RTL HDLs. A flip-flop in a first clock domain is instantiated at an always block 310 and clocked by a clock signal labeled "comp_clock_in." The always block also contains logic which sets the flip-flop to a particular value. The second clock domain contains a first flip-flop described by the module "pci_synchronizer_flop" 320. The second clock domain also contains a second flip-flop instantiated by an always block 330. The first and second flip-flops of the second clock domain are driven by the clock signal "req_clk_in" and together the flip-flops form the two-flip-flop synchronizer.

As hardware designs become more complex, the burden on the hardware designer to follow good design practices and to explicitly instantiate synchronizers between clock domains increases dramatically. Indeed, explicit clock synchronization may become untenable as designs continue to increase in size and complexity. Chip failures due to incorrect implementation of synchronizers are very difficult to detect, as they typically manifest themselves as seemingly random errors and lockups. Indeed, for an error to manifest itself, a particular combination of clock-edges and data inputs needs to occur. Such a combination may occur very infrequently and thus detecting such errors may require detailed and exhaustive techniques.

Yet typically many designers attempted to find errors due to incorrect use of synchronizer by visual inspection of the HDL circuit specification and other informal methods. As is apparent, with the large size of many modern designs, these informal methods are inadequate. Designers may also turn to a variety of automated "linting" tools to attempt to detect errors. While these tools are an improvement over informal methods, such as visual inspection, they too have their limitations, as described below. Commonly employed linting tools include Leda™ available from Synopsys, Inc, 1Team: Verify™ available from Atrenta, Inc, and nLint™ available from Novas Inc.

The ability of linting tools to detect clock domain crossing errors is limited due to a number of factors, foremost of which is that conventional HDLs do not well describe how signals are used. For example, most HDLs have relatively few data types, and these data types are mainly used to specify simulation behavior semantics, rather than design intent. In particular, conventional HDLs generally lack a specific data type for clock signals. Thus, linting tools may not turn to data types to determine design intent, and are forced to infer intent based upon common design practices and other estimations. When such inferences are incorrect, linting tool may become confused and thus be unable to recognize certain errors.

Further, since linting tools are generally separate from other design tools and simulators, it is incumbent upon the designer to choose a proper linting tool and to have the discipline to use it at appropriate times. If a designer fails to use an appropriate linting tool, errors will likely be missed, as many other design tools and simulators make little objection to timing errors. For example, it is often possible for a designer to simulate a design containing clock domain crossing errors on a simulator without the simulator objecting to the errors.

Thus, it is desirable to provide HDL functionality that simplifies the handling of clocks, and in particular simplifies passing signals between clock domains. Such functionality should largely remove from the designer the burden of explicitly and correctly instantiating synchronizers, for the majority of commonly encountered situations. Further, such functionality should allow one to create a design that is "correct by implementation," in that the HDL itself requires proper clock domain crossing synchronization, and thus removes the need for "after-the-fact" linting tools to verify this aspect of the design.

SUMMARY OF THE INVENTION

A HDL utilizing a TRS is provided that simplifies handling of clocks, and the signaling between various clock domains of a multi-clock domain circuit specification.

According to one embodiment of the present invention, a Term Rewriting System Compiler (TRSC) supports a specific clock data type for use by the designer in writing a circuit specification. The specific clock data type distinguishes clock signals from regular level-sampled signals. Further, the clock data type has "first-class citizenship" among other data supported by the TRSC, that is the clock data type may be passed as an argument, returned as a result, or may be a field of an interface. A library of clock primitives is provided for operation upon the clock data type, and the designer is permitted to specify additional clock primitives.

According to yet another embodiment of the present invention, clock domain crossing between clock domains driven by clocks of the same clock family is handled implicitly by the TRSC. A number of requirements for circuit specifications are mandated by the TRSC and collectively these requirements obviate the need for explicitly instantiated synchronization structures.

According to yet another embodiment of the present invention, the TRSC is configured to require use of a synchronizer at all clock domain crossing between clock domains driven by clocks of different clock families. The TRSC provides two types of facilities to meet this requirement, a "hardware approach" and a "linguistic approach." A "hardware approach" provides facilities for a designer to explicitly specify a synchronizer to be instantiated between clock domains, the synchronizer having source and destination ports which the designer connects to interfaces of modules in the respective clock domains. In some cases, TRS rules may be used to "enqueue" and to "dequeue" signals passed to the synchronizer or may be a part of the synchronizer's internal design. In contrast, a "linguistic approach" abstracts the instantiation of a synchronizer away from the designer and encapsulates synchronizer functionality into higher level programming constructs. Using a "linguistic approach" the designer effectively transforms an interface in one clock domain into a differently clocked interface in another clock domain, with the underlying synchronization handled by the TRSC.

BRIEF DESCRIPTION OF THE DRAWINGS

The invention description below refers to the accompanying drawings, of which:

FIG. 3, previously described above, is an exemplary code excerpt that includes an HDL implementation of a two-flip-flop synchronizer;

FIG. 6 is an exemplary partial TRS circuit specification that illustrates the use of a FIFO-based synchronizer to cross clock domains of different clock families according to a "hardware approach;"

FIG. 8a is an exemplary partial TRS circuit specification that illustrates the use of a "linguistic approach" to address the clock domain crossing issues previously discussed in reference to FIG. 6; and FIG. 8b is a partial TRS circuit specification of an exemplary converter referenced by the "linguistic approach" of FIG. 8a.

DETAILED DESCRIPTION

Figure 1A:
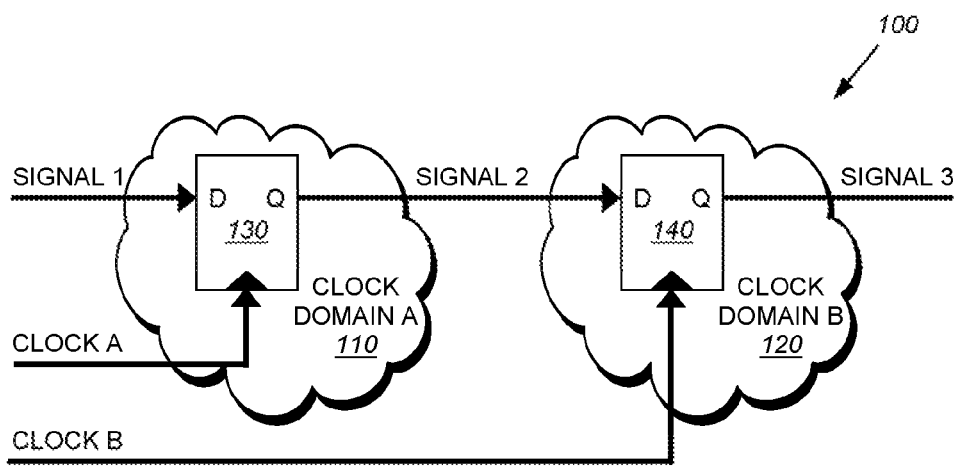
FIG. 1A, previously described above, is a schematic block diagram of an exemplary hardware design where metastability may occur due to a signal crossing between clock domains of different clock families.
Figure 1B:
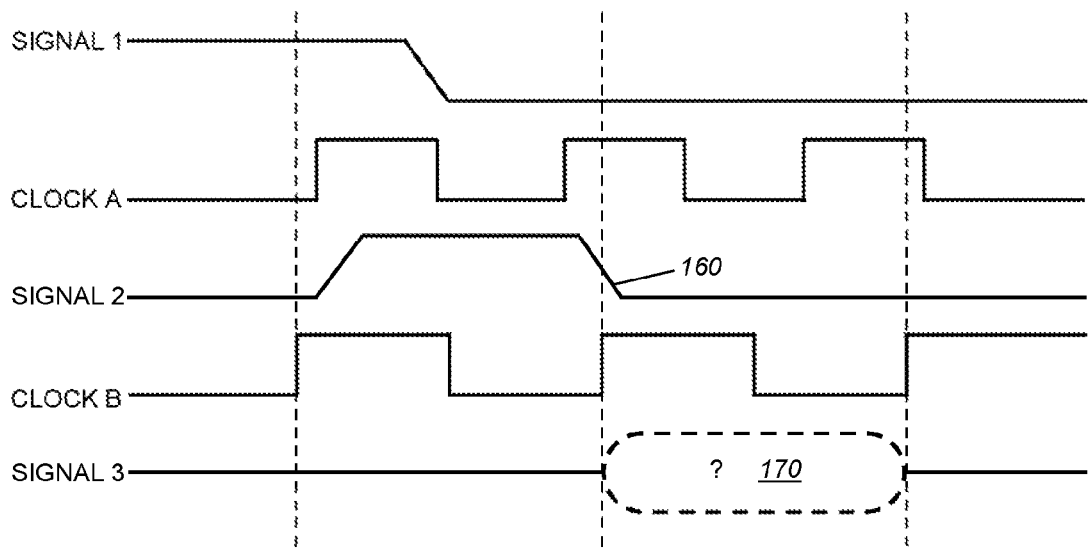
FIG. 1B, previously described above, is an exemplary timing diagram that corresponds to the exemplary hardware design shown in FIG. 1A.
Figure 2:
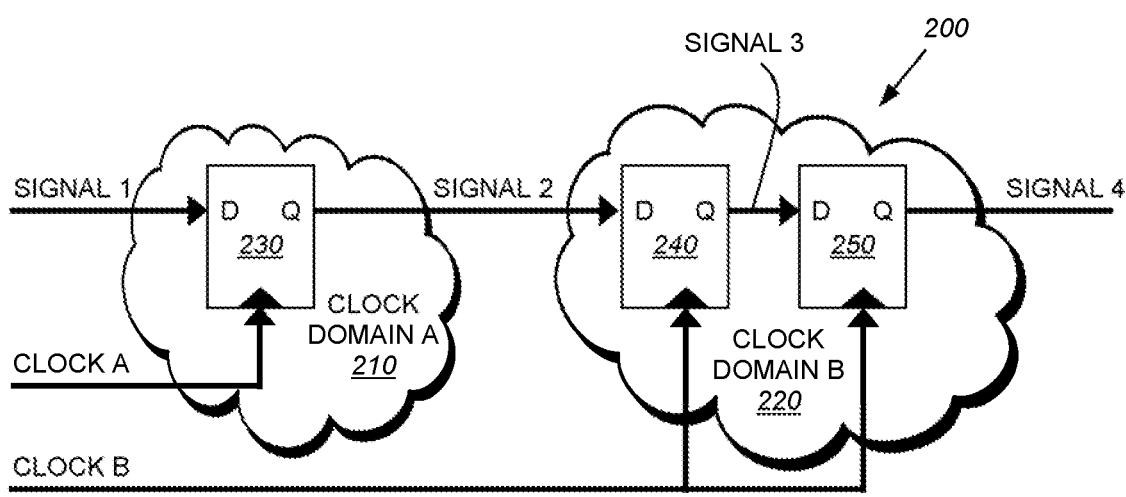
FIG. 2, previously described above, is a schematic block diagram of a two-flip-flop synchronizer according to the prior art.
Figure 4:
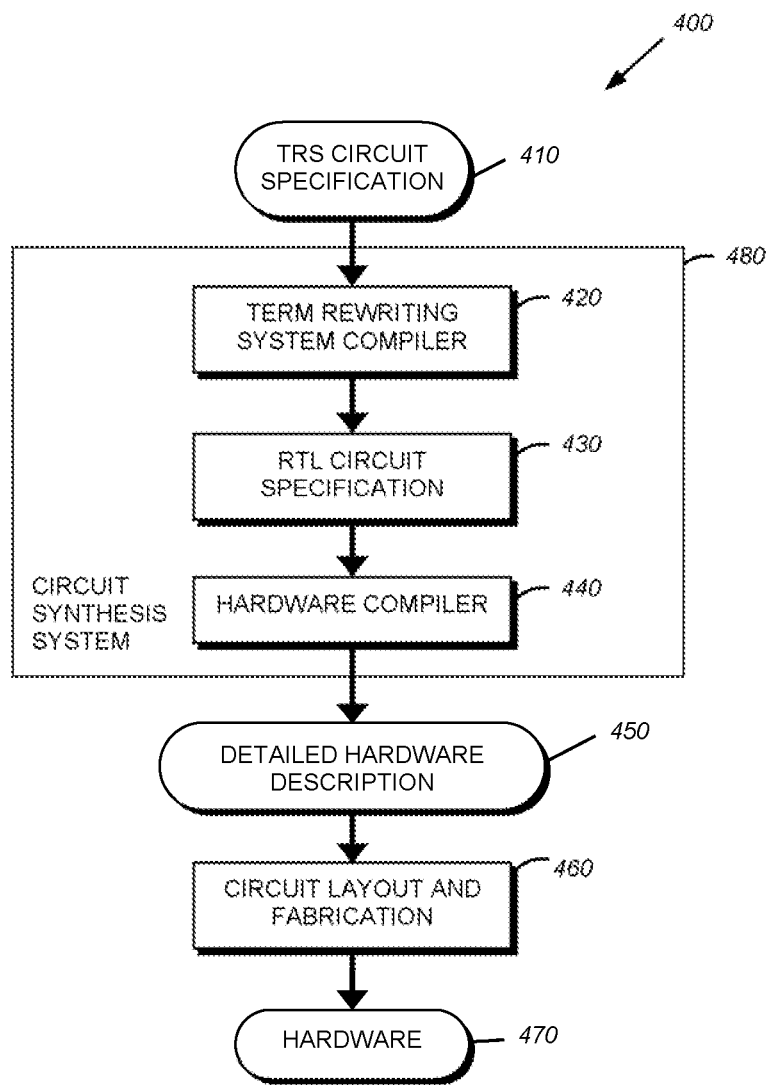
FIG. 4 is a flow diagram that illustrates the synthesis of a TRS circuit specification into a physical hardware device.

FIG. 4 is a flow diagram 400 that illustrates the synthesis of a TRS circuit specification 410 into a physical hardware device 470. The TRS circuit specification 410 is specified using a plurality of TRS rules that each have a predicate and an action body, and thus may be written in the general form:

$\pi(s) => s := \delta(s)$ where $\pi$ is the predicate and $s := \delta(s)$ is the action body. Function $\delta$ is used to compute the next state of the system from the current state s. The system functions by selecting a rule whose predicate is true, and then atomically (without interaction with other rules) executing the rule's action body. The selecting and executing of rules continues as long as some rule's predicate is true.

Such a system is suited for design and verification of complex digital systems as explained in Arvind and X. Shen, "Using Term Rewriting Systems to Design and Verify Processors," MIT LCS Memo CSG-419, *IEEE Micro*, May/June 1999; Mithal et al., Digital Circuit Synthesis System, U.S. Pat. No. 6,597,664; and Mithal et al., Digital Circuit Synthesis System, U.S. Pat. No. 6,977,907, all of which are incorporated by reference herein in their entirety.

In the preferred embodiment, the TRS circuit specification 410 is specified in Bluespec™ SystemVerilog (BSV), a variant of SystemVerilog that implements Term Rewriting System semantics in combination with other high level programming constructs. Bluespec™ SystemVerilog permits execution of multiple rules concurrently in each clock cycle, while maintaining the effect as if each rule has executed sequentially. A fuller description of Bluespec™ SystemVerilog may be found in the paper *Automatic Generation of Control Logic with Bluespec SystemVerilog*, published Feb. 1, 2005 and in the manual *Bluespec™ SystemVerilog Version 3.8 Reference Guide*, both of which are incorporated by reference as if fully set forth herein. Further, while Bluespec™ SystemVerilog may be used to great advantage to specify TRS circuit specification 410, it is expressly contemplated that other suitable HDLs, including those that do not make use of or make limited use of TRS rules, may be used with some or all of the teachings of described below. Accordingly, the below description should not be interpreted to require the use of Bluespec™ SystemVerilog or any other particular HDL.

The TRS circuit specification 410 is supplied to a circuit synthesis system 480, which in turn produces a detailed hardware description 450. The circuit synthesis system 480 includes a Term Rewriting System Compiler (TRSC) 420 which accepts the TRS circuit specification 410 and produces a RTL circuit specification 430. If the TRS circuit specification 410 is a BSV specification, the TRSC 420 may be a Bluespec™ Compiler (BSC). Further, in one embodiment, the RTL circuit specification 430 may be a Verilog description. It should be noted, though, that the RTL circuit specification 430 may alternately be implemented using another suitable HDL, for example, Very High Speed Integrated Circuits (VHSIC) Hardware Description Language (collectively termed VHDL) described in IEEE. Std 1076.

The RTL circuit specification 430 is passed to a hardware compiler 440, which in one embodiment is a Verilog compiler. The hardware compiler 440 produces a detailed hardware description 450 as an output. A circuit layout and fabrication system 460 makes used of the detailed hardware description 460 to fabricate physical circuit hardware 470, for example, a physical application specific integrated circuit (ASIC).

To illustrate the use of TRS rules in hardware design, assume the TRS circuit specification 410 characterize a circuit for computing the greatest common devisor (GCD) of two numbers using Euclid's algorithm. This example is chosen merely to illustrate a possible use of Term Rewriting System rules, and in no way limits the type of circuit that can be characterized by, or the syntax used in, TRS circuit specification 410. In this example, the TRS circuit specification 410 may read in part:

```
module mkGCD (ArithIO# (int));
    Reg# (int) x( );
    mkReg#(0) the_x (x);
    Reg#(int) y( );
    mkReg#(0) the_y (y);
    rule flip (x > y && y != 0);
        x <= y;
        y <= x;
    endrule
    rule sub (x <= y && y != 0);
        y <= y - x;
    endrule
    method Action input (int ix, int iy) if (y == 0);
        action
            x <= ix;
            y <= iy;
        endaction
```

```
    endmethod: input
    method int output( ) if (y == 0);
        return x;
    endmethod: output
endmodule: mkGCD
```

Referring to the exemplary code above, the module defines two registers, registers x and y. Further the module defines two rules, flip and sub, that implement Euclid's algorithm on registers x and y. Each rule contains a predicate and an action body. For example in rule flip, the expression, x<=y && x!=0 forms the predicate and the register write statements, x<=y;
y<=x;

form the action body.

If a predicate is omitted, the rule is assumed always to be applicable, and if the action body is omitted the rule has no effect. Assuming the registers x and y have been initialized with input values, the rules will repeatedly (that is, whenever a scheduler allows the rules to execute) update the registers with transformed values, terminating when the register y contains zero. At that point, the rules cease executing, and the GCD result is placed in register x. In this manner functionality typically implemented by always blocks in a conventional HDL may be specified in a concise and easily understood manner using TRS rules.

To specify more complex systems, several modules adapted to perform different functions, for example the Euclid's algorithm module shown and several other modules, may be specified. In this manner, very complex designs may be built in a modular fashion.

Single Clock Domain Designs

In many designs it is desirable to implement all the modules of the design in just one clock domain. The overhead and complexity of multiple clock domains is simply not appropriate for many applications, including many non-trivial applications.

According to one embodiment of the present invention, for single clock domain designs, the TRSC 420 is configured to manage instantiation of clock signals in an implicit manner. That is, while each instantiated module needs to be connected to a clock signal when the TRS circuit specification 410 is compiled, the designer is not required to explicitly include these connections in the TRS circuit specification 410. The TRSC 420 implicitly handles clock signals by generating a clock port, for example a port CLK, for each instantiated module, and for any sub-modules instantiated within the module. The clock ports are included in the generated RTL circuit specification 430 absent designer specification. They are further interconnected to flip-flops, registers, or other primitive state elements within the modules absent designer specification. In this way, the designer is spared the tedium of explicitly specifying a clock in the TRS circuit specification 410 and connecting the clock to each and every element that requires such connection.

Provision of a Clock Data Type

In order to support designs that require multiple clock domains, the TRSC 420 includes mechanisms to support explicit specification of clock signals by a designer. According to another embodiment of the present invention, a specific clock data type, for example a data type Clock, is provided for use by the designer in writing the TRS circuit specification 410. Use of a specific clock data type aids the designer in distinguishing clock signals from regular level-sampled signals. Further, use of an explicit clock data type is beneficial to other design tools that may more easily distinguish designer intent by referencing the data type.

The clock data type is preferably granted many of the properties of other data types supported by the TRSC 420, and accordingly may be characterized as having "first-class citizenship" among the provided data types. Specifically, the clock data type may be passed as an argument, returned as a result, or may be a field of an interface.

Clock data type signals, however, are prevented by the TRSC 420 from being operated upon by general-purpose logic. Preventing such logic from operating upon clock data type signals ensures phase and skew errors are not introduced into the signals. Rather than use general purpose logic, special clock primitives, defined in a RTL language, are provided to operate upon clock data type signals. Such clock primitives may be part of a provided library of general-purpose clock primitives, or may be specified by the designer using a RTL language. In this way, the designer is provided the ease of use of a packaged library, with the flexibility to implement custom clock primitives to address particular design requirements when advantageous.

For example, in a case where a designer has two clock data type signals, c1 and c2, and desires to dynamically select between these signals based upon the value of a signal b, which is unknown at compile time, the TRSC 420 will object to use of general combination logic with the clock data type signals. Instead, the designer is required to use a special clock primitive, for example, the clock primitive ClockSelect that is included in a library of clock primitives. Use of ClockSelect causes the following Verilog RTL code to be included in the RTL circuit specification 430 to accomplish the desired selection of clock signals:

```
module ClockSelect(CLK, RST_N, SELECT, SELECT_ENABLE,
A_CLK, A_CLKGATE, B_CLK, B_CLKGATE, OUT_CLK,
OUT_CLKGATE, OUT_RST_N) ;
    parameter       RSTDELAY = 2 ; // Width of reset shift reg
    input           CLK;
    input           RST_N;
    input           SELECT;
    input           SELECT_ENABLE;
    input           A_CLK;
    input           A_CLKGATE;
    input           B_CLK;
    input           B_CLKGATE;
    output          OUT_CLK;
    output          OUT_CLKGATE;
    output          OUT_RST_N;
    wire            not_changed;
    reg             select_out;
    reg             select_out2;
    reg [RSTDELAY:0] reset_hold;
    wire            new_clock;
    assign          OUT_CLK = new_clock;
    assign {new_clock, OUT_CLKGATE } = select_out == 1'b1 ?
                    { A_CLK, A_CLKGATE }:
                    { B_CLK, B_CLKGATE };
    // Consider the clock select change when it *really* does change
    // or when the select reset is asserted.
    assign not_changed = ! ((select_out != select_out2) ||
    (RST_N == 0));
    assign OUT_RST_N = reset_hold[RSTDELAY];
    always @(posedge CLK or negedge RST_N )
        begin
            if( ! RST_N )
                begin
                    select_out <= 1'b0;
                    select_out2 <= 1'b0;
                end
            else
                begin
                    if ( SELECT_ENABLE )
                        begin
                            select_out <= SELECT;
                        end
                    select_out2 <= select_out;
                end
        end
    // Shift the reset hold register to generate a reset for some clock
    times
    always @(posedge new_clock or negedge not_changed )
        begin: rst_shifter
            if ( !not_changed)
                begin
                    reset_hold <= 'b0;
                end
            else
                begin
                    reset_hold <= ( reset_hold << 1 ) | 'b1 ;
                end
        end
endmodule
```

In this manner, the provided, and user defined, clock primitives may be used in conjunction with the clock data type to explicitly specify clock signals in designs.

Clock Domain Crossing within a Clock Family

Using the clock data type, a designer may implement a number of different clock domains in a design. In the simplest case, multiple clock domains are driven by clock signals of the same clock family. As discussed above, clocks of the same family differ only in gating and have the same underlying oscillator. According to one embodiment of the present invention, the TRSC 420 is configured to automatically detect when clocks in different clock domains differ only in gating, and in response to this detection handle clock domain crossing in an implicit manner. That is, clock domain crossing in this case is handled by requirements the TRSC 420 mandates of the TRS circuit specification 410, rather than by any explicitly instantiated synchronization structures.

The TRSC 420 automatically handles clock domain crossing within the same clock family implicitly by requiring the designer to meet several requirements in specifying the TRS circuit specification 410. If the designer does not meet these requirements when specifying the TRS circuit specification 410, error messages or other indications are presented to the designer, and the designer is prompted to address these issues. First, the TRSC 420 requires that all methods of the TRS circuit specification 410 that are invoked by a particular other method, or that are invoked by a particular TRS rule, (hereinafter "invoked methods") are driven by a clock of the same family. That is, any particular method or TRS rule may only invoke a group of methods that are all driven by clocks of the same family. Second, the TRSC 420 requires that a method that invokes another method (hereinafter "invoking method"), or a TRS rule that invokes a method (hereinafter "invoking TRS rule"), is driven by a clock of the same clock family as its invoked methods. Third, the TRSC 420 requires that the clock of an invoking method or an invoking TRS rule may be gated "on", i.e. active, if-and-only-if all the clocks of the invoked methods are also gated "on." While this gating requirement may be specified explicitly by the designer, according to one embodiment of the present invention, the TRSC 420 is configured to automatically generate and interconnect a new clock signal of the same clock family that implements this gating requirement. Finally, the TRSC 420 requires that the predicate of any method that effects a state transition must include a reference to the method's clock signal, so that a method is only considered ready when its clock is gated "on." This requirement only applies to methods that execute a state transition, and a method that merely returns a value is allowed to return the value even if the clock has been gated off.

Collectively, the above requirements allow the TRSC 420 to implicitly handle multiple clock domains driven by clock signals of the same family, and thus obviates the need for any other special provisions when crossing between these clock domains.

Clock Domain Crossing Between Different Clock Families

Clock domain crossing between clock domains with clocks of different families is more complicated and accordingly requires additional specification by a designer. According to one embodiment of the present invention, the TRSC 420 is configured to require that synchronizers are used at all such clock domain crossings. The TRSC 420 provides two types of facilities for specifying synchronizers to meet this requirement. First, a "hardware approach" is provided where designers may explicitly specify a synchronizer to be instantiated between the clock domains, the synchronizer having source and destination ports that the designer connects to interfaces of modules in the respective clock domains. Second, a "linguistic approach" is provided that abstracts the instantiation of a synchronizer away from the designer and encapsulates synchronizer functionality into higher level programming constructs. Using a "linguistic approach," the designer may effectively transform an interface in one clock domain into a differently clocked interface in another clock domain. Thus, the designer specifies the TRS circuit specification 410 in terms of differently clocked interfaces, and the TRSC 420 automatically manages the actual synchronization of signals underlying these interfaces.

Figure 5:
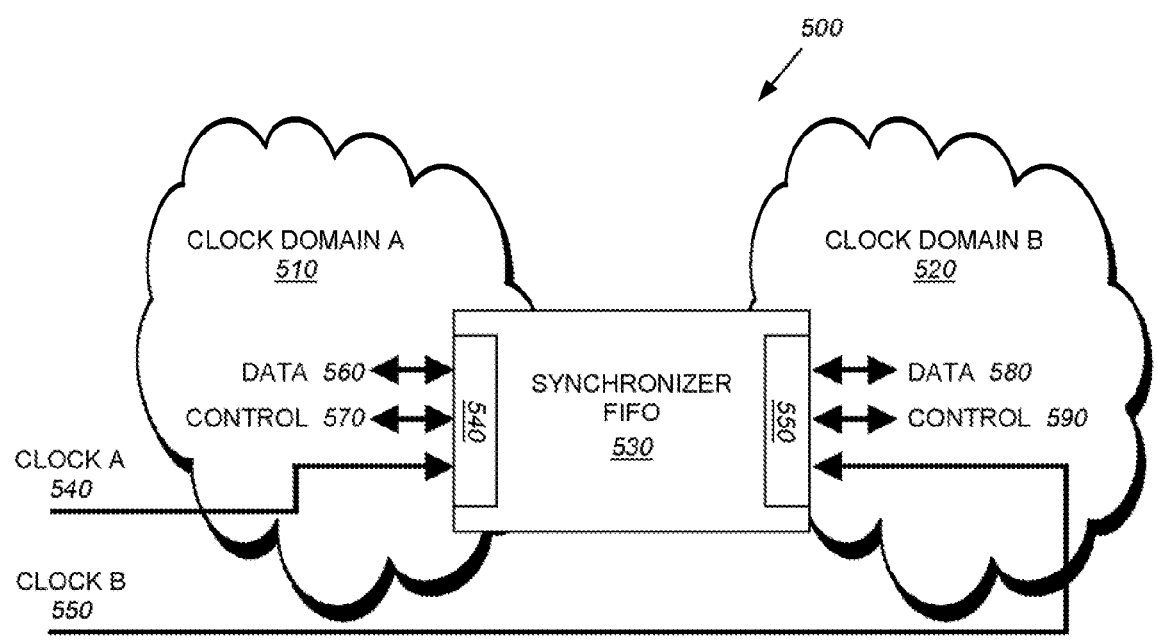
FIG. 5 is an exemplary schematic block diagram that illustrates use of a synchronizer to cross clock domains of different clock families according to a "hardware approach;"

FIG. 5 is an exemplary schematic block diagram that illustrates use of a synchronizer to cross clock domains of different clock families according to a "hardware approach." Two clock domains are shown, Clock Domain A 510, which is driven by Clock A 540, and Clock Domain B 520 which is driven by Clock B 550. Clock A 540 and Clock B 550 are driven by different oscillators (not shown). A designer may explicitly instantiate a synchronizer 530 to interconnect the two clock domains according to a "hardware approach," the synchronizer 530 having ports 540, 550, one in each clock domain. These ports are clocked according to the clock signals of the respective clock domains.

In one embodiment, the synchronizer 530 is instantiated using a design provided in a library of well-known synchronizer designs included with the TRSC 420. For example, the Synchronizer 540 may be a well-known FIFO-based synchronizer included in such a library. In an alternate embodiment, the synchronizer 530 is specified explicitly by the designer using a RTL language. In this way, the designer is free to implement alternative, possibly more efficient, synthesizer designs depending upon the particular application.

The ports 540, 550 of the synchronizer are connected to interfaces of modules (not shown) in each of the clock domains, using data connections 560, 570 and control connections 580, 590. In one embodiment, the interfaces may be well known Put and Get interfaces. An interface of type Put is an interface into which one may place a particular value. Similarly, an interface of type Get is an interface where a particular may be once-retrieved, i.e. values are read and then removed from the interface.

In order to manage the communication of the interfaces (not shown) with the ports 540, 550 of the synchronizer 530, the designer may specify one or more TRS rules to interact with the synthesizer. For example, the designer may specify one TRS rule to enqueue data from an interface (not shown) in Clock Domain A 510 to the first port 540 of the synchronizer 530 and a second TRS rule to dequeue data from the second port 550 of the synchronizer 530, to an interface (not shown) in Clock Domain B 520. Also, TRS rule may be used to as part of the internal specification of certain types of synchronizer. Further detail of the use of TRS rules in connection to synchronizers is provided below.

FIG. 6 is an exemplary partial TRS circuit specification 600 that illustrates the use of a FIFO-based synchronizer to cross clock domains of different clock families according to a "hardware approach." In addition, one portion of FIG. 6 also illustrates implicit handling of a clock domain crossing between clock domains of the same clock family. A first code section 610 of the exemplary TRS circuit specification 600 defines three clock signals, c0, c1, and c2. Two of the clocks signals, c0 and c2, are defined to originate from the same oscillator, currentClock, and accordingly differ only in gating and are considered to be of the same clock family. The third clock signal, c1, is defined to originate from a different oscillator, and accordingly is considered to be of a different clock family.

A second code section 620 instantiates three modules, gens, user1, and user2, which are clocked by the three clocks, c0, c1, and c2, respectively. In the exemplary partial TRS circuit specification 600, the module gens contains a pair of Get interfaces, while modules user1 and user2 include Put interfaces.

Since c0 and c2 are of the same clock family, gens and user2 are connected without explicit synchronization, according to one of the embodiments of the present invention described above. Such a connection is illustrated in the third code section 630, which shows a connection instantiated by a block mkConnection.

Since c0 and c1 are of different clock families, they are interconnected by a synchronizer, which is shown explicitly instantiated in the fourth code section 640. In this exemplary partial TRS circuit specification 600, the synchronizer is a FIFO-based synchronizer and is instantiated by a block mkSyncFIFO. However, the synchronizer may be of a different type, and therefore use of a FIFO-based synchronizer should merely be taken by way of example. The block mkSyncFIFO is supplied with both clock c0 and clock c1, and therefore is considered to have ports in both clock domains.

At the fifth code section 650, two TRS rules are implemented to supply and retrieve data from the synchronizer. A first TRS rule enqueue_ff operates to supply data from the module gens using the Get interface, and a second rule dequeue_ff operates to retrieves data from the synchronizer and bring the data into user1 using the supplied Put interface. In this manner, TRS rules are employed to control data flow to and from the synchronizer, and thus to coordinate the crossing of the clock domain boundaries.

While the above described "hardware approach" has many advantages, and provides a designer considerable design flexibility, in some situations it is desirable to abstract synchronizer usage. Therefore, according to another embodiment of the present invention, a "linguistic approach" is also provided that encapsulates synchronizer functionality into a higher level programming construct. From the designer's perspective, a "linguistic approach" seamlessly transforms an interface in one clock domain into a differently clocked interface in another clock domain of a different family. In this manner, a "linguistic approach" allows a designer to specify a design simply in terms of interfaces, rather than in terms of synchronizers connected to interfaces. The designer may simply create an interface in the clock domain needed, and then connect this interface to the circuitry of that clock domain. The underlying synchronizer instantiation is handled transparently by the TRSC 420.

Figure 7:
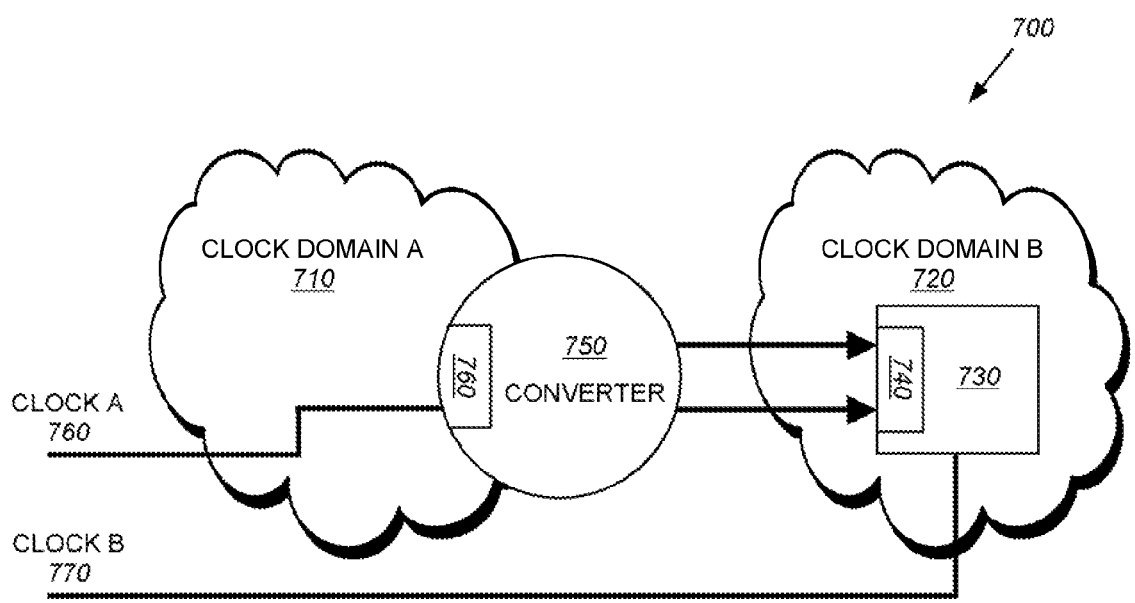
FIG. 7 is an exemplary schematic block diagram that illustrates crossing of clock domains of different families according to a "linguistic approach;"

FIG. 7 is an exemplary schematic block diagram that illustrates crossing of clock domains of different families according to a "linguistic approach." It should be understood that FIG. 7 is drawn from the perspective of a designer, and accordingly the underlying synchronization that is performed by the TRSC 420 is not shown. Again, two clock domains are shown, Clock Domain A 710 driven by Clock A 760 and Clock Domain B 720 driven by Clock B 770, where Clock A and Clock B are driven by clock signals originating from different oscillators. Module 730 is instantiated in Clock Domain B 720 having an interface 740 in that clock domain. The interface 740 may be a well-known Get or Put interface, or alternately may be an interface of another known interface type. To permit communication with the module 730 from Clock Domain A 710 according to a "linguistic approach," the designer instantiates a converter 750 that projects the interface 740 into Clock Domain A 710. That is, the converter 750 creates another interface 760 for the module 730 of the same type as the first interface 740, the other interface 760 residing in Clock Domain A 710. The designer then may interconnect the new interface 760 to the appropriate circuitry in Clock Domain A. In this way, a higher level of abstraction is provided to the designer, and the task of instantiating a synchronizer is abstracted away for implementation by the TRSC 420.

FIG. 8a is an exemplary partial TRS circuit specification 800 that illustrates the use of a "linguistic approach" to address the clock domain crossing issues previously discussed in reference to FIG. 6. The exemplary partial TRS circuit specification 800 may be substitute in place of the "hardware approach" described in the fourth and fifth code sections 640, 650 of FIG. 6, and would cause the TRSC 420 to produce a substantially similar RTL circuit specification 430 as the above described "hardware approach." In FIG. 8a, the first line of code 810 instantiates a converter mkConverter, referencing the original interface, user1.fst, and producing a new interface, user1.ifc, that is of the same type as the original interface but clocked by clock signal c1, the clock of a different clock domain. There is no need to specify the clock signal of the original interface c0, as the converter can determine this itself. Similarly, there is no need to specify the clock of the new clock domain, clock c1, as it is the clock of the environment surrounding the converter and is thus known to the converter. The second line of code 820 then connects the newly instantiated interface user1.ifc to other circuitry in the clock domain and thereby completes the formation of the differently clocked interface.

To provide flexibility for a wide variety of interface types, the converter's name, here called mkConverter, is overloaded. Overloading is a type of polymorphism well known in the art where different functions with the same name are invoked based upon the data types of the parameters provided to the function. Accordingly, appropriate converter functionality may be provided for a variety of interface types supported by the TRSC 420 using the same converter name.

FIG. 8b is a partial TRS circuit specification 850 of an exemplary converter referenced by the "linguistic approach" of FIG. 8a. Specifically FIG. 8b depicts a converter appropriate for a Put interface that may be used in FIG. 8a. As is apparent, there is substantial similarity between the structures of FIG. 8b and portions of FIG. 6. At an underlying level, a "linguistic approach" may use many of the same primitive as a "hardware approach." Yet these primitive are abstracted away from the designer by a "linguistic approach," and implemented by underlying modules called by the TRSC 420.

In a first section of code 860, the converter creates a FIFO-based synchronizer instantiated by the block mkSyncFIFOFromCC, a variant of the block mkSyncFIFO discussed above in reference to the previously described "hardware approach." At a second section of code 870, the signals are enqueued into the FIFO-based synchronizer using the put method of the original interface. Finally, at the third code section 880, a TRS rule is employed to dequeue items from the FIFO. This TRS rule operates to supply dequeued items to a put method of the interface interconnected to the synchronizer, in this manner creating an interface in the destination clock domain. This functionality collectively may be used as part of a "linguistic approach" to seamlessly transform an interface in one clock domain into a differently clocked interface in another clock domain of a different family.

The foregoing has been a detailed description of a several embodiments of the present invention. Further modifications and additions can be made without departing from the invention's intended spirit and scope. It is expressly contemplated that any or all of the processes and data structures described above can be implemented in hardware, software or a combination thereof. A software implementation may comprise a computer-readable medium containing executable program instructions for execution on a computer. It should be remembered that the above descriptions are meant to be taken only by way of example, and not to otherwise limit the scope of this invention.

What is claimed is:

1. A method for designing a digital circuit using a hardware description language (HDL), the method using a computer and comprising the steps of:
   specifying a module in a first clock domain, using the HDL, wherein the HDL is an HDL having Term Rewriting System (TRS) rules;
   specifying an interface to the module in a second clock domain, the first and second clock domains driven by clock signals that are of different clock families and driven by different oscillators; and
   detecting, by an HDL compiler, the specification of the interface in the second clock domain and automatically instantiating a synchronizer interconnecting the module in the first clock domain with the interface in the second clock domain, the HDL compiler is a Term Rewriting System Compiler (TRSC);
   specifying one or more TRS rules in the second clock domain to interchange signals with the interface, the one or more TRS rules each having a predicate and an action body;
   wherein the step of specifying an interface to the module in a second clock domain further comprises the step of:
   implementing a converter to convert an interface of the module in the first clock domain, to be the interface of the module in the second clock domain, wherein a name of the converter is overloaded to provide different functionality dependent upon parameters provided to the converter.

2. The method of claim 1 wherein the converter supports conversion of an interface selected from the group consisting of a Put interface and a Get interface.

3. The method of claim 1 wherein the step of detecting further comprises the step of:
   generating a Register Transfer Level (RTL) specification, the RTL specification including an RTL description of the synchronizer.

4. A hardware design system including a processor executing a program stored on a storage medium for designing a digital circuit, the hardware design system including:
- an HDL to create a circuit specification, the HDL configured to permit specification of a module in a first clock domain and to permit specification of an interface for the module in a second clock domain, the first and second clock domains driven by clock signals that are of different clock families and driven by different oscillators, the HDL is an HDL having Term Rewriting System (TRS) rules; and
- an HDL compiler for use with the circuit specification, the HDL compiler configured to detect the specification of the interface in the second clock domain and automatically instantiate a synchronizer between the module in the first clock domain and the interface in the second clock domain, the HDL compiler is a Term Rewriting System Compiler (TRSC);
- one or more TRS rules in the second clock domain, each of the one or more TRS rules configured to interchange signals with the interface in the second clock domain, each of the one or more TRS rules having a predicate and an action body; and
- a converter configured to convert an interface of the module in the first clock domain, to be the interface of the module in the second clock domain, wherein a name of the converter is overloaded to provide different functionality dependent upon parameters provided to the converter.

5. The hardware design system of claim 4 wherein the converter supports conversion of an interface selected from the group consisting of a Put interface and a Get interface.

6. The hardware design system of claim 4 further comprising:
- a Register Transfer Language (RTL) specification generated by the HDL compiler, the RTL specification including an RTL description of the synchronizer.

* * * * *